(12) United States Patent
Feldhausen

(10) Patent No.: US 12,103,121 B2
(45) Date of Patent: Oct. 1, 2024

(54) METHODS AND APPARATUS TO CONTROL WELDING POWER AND PREHEATING POWER

(71) Applicant: Illinois Tool Works Inc., Glenview, IL (US)

(72) Inventor: Joseph Feldhausen, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 538 days.

(21) Appl. No.: 16/833,875

(22) Filed: Mar. 30, 2020

(65) Prior Publication Data

US 2020/0346296 A1 Nov. 5, 2020

Related U.S. Application Data

(60) Provisional application No. 62/840,652, filed on Apr. 30, 2019.

(51) Int. Cl.
*B23K 9/10* (2006.01)
*B23K 9/095* (2006.01)

(52) U.S. Cl.
CPC .......... *B23K 9/1062* (2013.01); *B23K 9/0953* (2013.01)

(58) Field of Classification Search
CPC ...... B23K 9/10; B23K 9/1062; B23K 9/1063; B23K 9/09; B23K 9/095; B23K 9/0953; B23K 9/0956; B23K 9/1056; B23K 9/173
See application file for complete search history.

(56) References Cited

U.S. PATENT DOCUMENTS

| | | |
|---|---|---|
| 2,365,958 A | 12/1944 | Holslag |
| 2,416,047 A | 2/1947 | Dolan |
| 2,976,462 A | 3/1961 | Miller |
| 3,030,495 A | 4/1962 | Anderson |
| 3,288,982 A | 11/1966 | Haruyoshi |
| 3,549,857 A | 12/1970 | Carter |
| 3,725,629 A | 4/1973 | Vickers |
| 3,809,853 A | 5/1974 | Manz |
| 3,849,871 A | 11/1974 | Kaunitz |

(Continued)

FOREIGN PATENT DOCUMENTS

| | | |
|---|---|---|
| AT | 413801 | 6/2006 |
| CA | 2072711 | 12/1992 |

(Continued)

OTHER PUBLICATIONS

"ALT 304," Miller—The Power of Blue, Jun. 2001.

(Continued)

*Primary Examiner* — Brian W Jennison
(74) *Attorney, Agent, or Firm* — McAndrews, Held & Malloy, Ltd.

(57) ABSTRACT

An example welding system includes: power conversion circuitry configured to: output welding-type power to a weld circuit; and output preheating power to a preheater; and control circuitry configured to: receive an input selecting one of a plurality of weld schedules, each of the plurality of weld schedules specifying a combination of a welding-type output power and a preheating output power; and control the power conversion circuitry to output the welding-type power and the preheating power based on the selected one of the plurality of weld schedules.

19 Claims, 6 Drawing Sheets

(56) References Cited

U.S. PATENT DOCUMENTS

| | | |
|---|---|---|
| 3,912,980 A | 10/1975 | Crump |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,329,561 A | 5/1982 | Schafer |
| 4,426,565 A | 1/1984 | Rueter |
| 4,447,703 A | 5/1984 | Stol |
| 4,467,176 A | 8/1984 | Mizuno |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A | 4/1986 | Stol |
| 4,614,856 A | 9/1986 | Hori |
| 4,628,182 A | 12/1986 | Hori |
| 4,631,385 A | 12/1986 | Rothermel |
| 4,667,083 A | 5/1987 | Stol |
| 4,675,494 A | 6/1987 | Dilay |
| 4,728,761 A | 3/1988 | Mucha |
| 4,816,639 A | 3/1989 | Sugitani |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A * | 1/1994 | Blankenship ........ B23K 9/0953 219/125.1 |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,521,355 A | 5/1996 | Lorentzen |
| 5,526,561 A | 6/1996 | McGaffigan |
| 5,644,461 A | 7/1997 | Miller |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn et al. |
| 5,760,373 A | 6/1998 | Colling |
| 5,773,799 A | 6/1998 | Maxfield |
| 5,783,799 A | 7/1998 | Geissler |
| 5,832,765 A | 11/1998 | Ohashi |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano |
| 6,078,023 A | 6/2000 | Jones |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stava |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,479,793 B1 * | 11/2002 | Wittmann ............ B23K 9/0953 219/130.5 |
| 6,486,439 B1 | 11/2002 | Spear et al. |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship et al. |
| 6,642,482 B2 | 11/2003 | Rappl |
| 6,670,579 B2 | 12/2003 | Davidson et al. |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,995,338 B2 | 2/2006 | Hutchison |
| 7,002,103 B2 | 2/2006 | Holverson |
| 7,105,775 B2 | 9/2006 | Giese |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,381,923 B2 | 6/2008 | Gordon et al. |
| 7,576,300 B2 | 8/2009 | Giese |
| 7,626,139 B2 | 12/2009 | Matsuguchi |
| 7,683,290 B2 | 3/2010 | Daniel |
| 7,705,270 B2 | 4/2010 | Norrish |
| 8,203,100 B2 | 6/2012 | Ueda |
| 8,288,686 B2 | 10/2012 | Kaufman |
| 8,304,693 B2 | 11/2012 | Ma |
| 8,357,877 B2 | 1/2013 | Ma |
| 8,487,215 B2 | 7/2013 | Holverson |
| 8,604,388 B2 | 12/2013 | Dingeldein |
| 9,095,928 B2 | 8/2015 | Ash |
| 9,162,312 B2 | 10/2015 | Ma |
| 9,193,004 B2 | 11/2015 | Enyedy et al. |
| 9,193,005 B2 | 11/2015 | Ma |
| 9,227,262 B2 | 1/2016 | Wiryadinata |
| 9,233,432 B2 | 1/2016 | Zhang |
| 9,403,231 B2 | 8/2016 | Hutchison |
| 9,409,250 B2 | 8/2016 | Daniel |
| 9,463,523 B2 | 10/2016 | Roth |
| 9,539,662 B2 | 1/2017 | Hutchison |
| 9,669,486 B2 | 6/2017 | Dingeldein |
| 9,862,050 B2 | 1/2018 | Cole |
| 9,950,383 B2 | 4/2018 | Davidson |
| 10,906,114 B2 * | 2/2021 | Hutchison ................ B23K 9/28 |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0010756 A1 | 1/2003 | Enyedy |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0072762 A1 | 4/2005 | Delgado |
| 2005/0082268 A1 | 4/2005 | Lajoie |

(56) References Cited

U.S. PATENT DOCUMENTS

| | | |
|---|---|---|
| 2005/0184039 A1 | 8/2005 | Stava |
| 2005/0218132 A1 | 10/2005 | Wells |
| 2005/0269306 A1 | 12/2005 | Fulmer |
| 2006/0138115 A1 | 6/2006 | Norrish |
| 2006/0163227 A1 | 7/2006 | Hillen |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson et al. |
| 2009/0215302 A1 | 8/2009 | Roberts |
| 2009/0230941 A1* | 9/2009 | Vogel ............... B23K 9/091 323/305 |
| 2010/0012637 A1 | 1/2010 | Jaegar |
| 2010/0059493 A1 | 3/2010 | McAninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0225280 A1* | 9/2010 | Vogel ............... H02J 7/045 320/145 |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0204035 A1 | 8/2011 | Grossauer |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2012/0298643 A1* | 11/2012 | Lambert ............... B23K 9/10 219/130.21 |
| 2013/0112674 A1 | 5/2013 | Mnich |
| 2013/0112676 A1 | 5/2013 | Hutchison |
| 2013/0213942 A1 | 8/2013 | Peters |
| 2013/0264323 A1 | 10/2013 | Daniel |
| 2013/0270245 A1 | 10/2013 | Holverson |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0158669 A1 | 6/2014 | Davidson |
| 2014/0177109 A1 | 6/2014 | Curtis |
| 2014/0183176 A1 | 7/2014 | Hutchison |
| 2014/0217077 A1 | 8/2014 | Davidson |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney et al. |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0213921 A1 | 7/2015 | Koide |
| 2015/0251275 A1 | 9/2015 | Denney et al. |
| 2015/0273612 A1 | 10/2015 | Peters |
| 2015/0283638 A1 | 10/2015 | Henry |
| 2015/0283639 A1 | 10/2015 | Henry |
| 2016/0074954 A1 | 3/2016 | Marschke |
| 2016/0074973 A1 | 3/2016 | Kachline |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry et al. |
| 2016/0288235 A1 | 10/2016 | Davidson |
| 2016/0318112 A1 | 11/2016 | Hutchison |
| 2017/0019727 A1 | 1/2017 | McGarry |
| 2017/0080512 A1 | 3/2017 | Centner |
| 2017/0165778 A1 | 6/2017 | Hsu |
| 2017/0225255 A1 | 8/2017 | Zwayer |
| 2017/0334011 A1* | 11/2017 | Peters ............... B23K 9/091 |
| 2018/0099346 A1* | 4/2018 | Zwayer ............... B23K 9/125 |
| 2018/0185947 A1* | 7/2018 | Knoener ............... B23K 9/287 |
| 2018/0185950 A1* | 7/2018 | Knoener ............... B23K 9/1087 |
| 2018/0236585 A1 | 8/2018 | Davidson |
| 2018/0304394 A1* | 10/2018 | Vogel ............... H02M 3/3353 |
| 2018/0333798 A1* | 11/2018 | Uecker ............... B23K 9/235 |
| 2018/0354052 A1 | 12/2018 | Schartner |
| 2018/0354057 A1 | 12/2018 | Sigl |
| 2018/0354075 A1 | 12/2018 | Liu |
| 2019/0070689 A1 | 3/2019 | Bunker |

FOREIGN PATENT DOCUMENTS

| | | |
|---|---|---|
| CA | 2883947 | 3/2014 |
| CN | 2125475 | 12/1992 |
| CN | 2181354 | 11/1994 |
| CN | 1298778 | 6/2001 |
| CN | 1496774 | 5/2004 |
| CN | 1600486 | 3/2005 |

(56) References Cited

FOREIGN PATENT DOCUMENTS

| | | |
|---|---|---|
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 201249331 | 6/2009 |
| CN | 101804495 | 8/2010 |
| CN | 101862886 | 10/2010 |
| CN | 102059476 | 5/2011 |
| CN | 102470473 | 5/2012 |
| CN | 102554418 | 7/2012 |
| CN | 102596475 | 7/2012 |
| CN | 102770228 | 11/2012 |
| CN | 102825370 | 12/2012 |
| CN | 202824943 | 3/2013 |
| CN | 104968465 | 10/2015 |
| CN | 108472759 | 8/2018 |
| DE | 2228701 | 12/1972 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0204559 | 12/1986 |
| EP | 0387223 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2522453 | 11/2012 |
| EP | 2892680 | 7/2015 |
| EP | 2781291 | 10/2015 |
| FR | 1443701 | 6/1966 |
| JP | S5719166 | 2/1982 |
| JP | S57109573 | 7/1982 |
| JP | S583784 | 1/1983 |
| JP | S58119466 | 7/1983 |
| JP | S60108175 | 6/1985 |
| JP | S60108176 | 6/1985 |
| JP | S60170577 | 9/1985 |
| JP | 61186172 | 8/1986 |
| JP | S629773 | 1/1987 |
| JP | S6471575 | 3/1989 |
| JP | H03285768 | 12/1991 |
| JP | H06277840 | 10/1994 |
| JP | H07204848 | 8/1995 |
| JP | H1097327 | 4/1998 |
| JP | H11156542 | 6/1999 |
| JP | 2001276971 | 10/2001 |
| JP | 2003205385 | 7/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| JP | 2014176890 | 9/2014 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2014140783 | 9/2014 |
| WO | 2015125008 | 8/2015 |

OTHER PUBLICATIONS

"Maxstar 200 SD, DX, and LX," Miller Electric Mfg. Co., Oct. 2003.
Bondy et al., "Graph Theory with Applications," Department of Combinatorics and Optimization, University of Waterloo, 1976, p. 7-8.
Gupta, "A low temperature hydrogen sensor based on palladium nanoparticles," Published in 2014.
Lincoln Electric, "Storing and Redrying Electrodes," Published in 2011.
N.A.: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BChe&oldid=157333005, [retrieved on Sep. 26, 2018], with machine translation, 2 pages.
Pitrun, "The effect of welding parameters on levels of diffusible hydrogen in weld metal deposited using gas shield rutile flux cored wires," Published in 2004.
European Office Action Appln No. 20167390.2 dated Feb. 5, 2021.
European Examination Report Appln No. 20167390.2 dated Oct. 30, 2023.
Canadian Office Action Appln No. 3,077,816 dated Oct. 17, 2023.

\* cited by examiner

METHODS AND APPARATUS TO CONTROL WELDING POWER AND PREHEATING POWER

RELATED APPLICATIONS

This patent claims the benefit of U.S. Provisional Patent Application Ser. No. 62/840,652, filed Apr. 30, 2019, entitled "METHODS AND APPARATUS TO CONTROL WELDING POWER AND PREHEATING POWER." The entirety of U.S. Patent Application Ser. No. 62/840,652 is expressly incorporated herein by reference.

BACKGROUND

This disclosure relates generally to welding and, more particularly, to methods and apparatus to control welding power and preheating power.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

Methods and apparatus to control welding power and preheating power are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
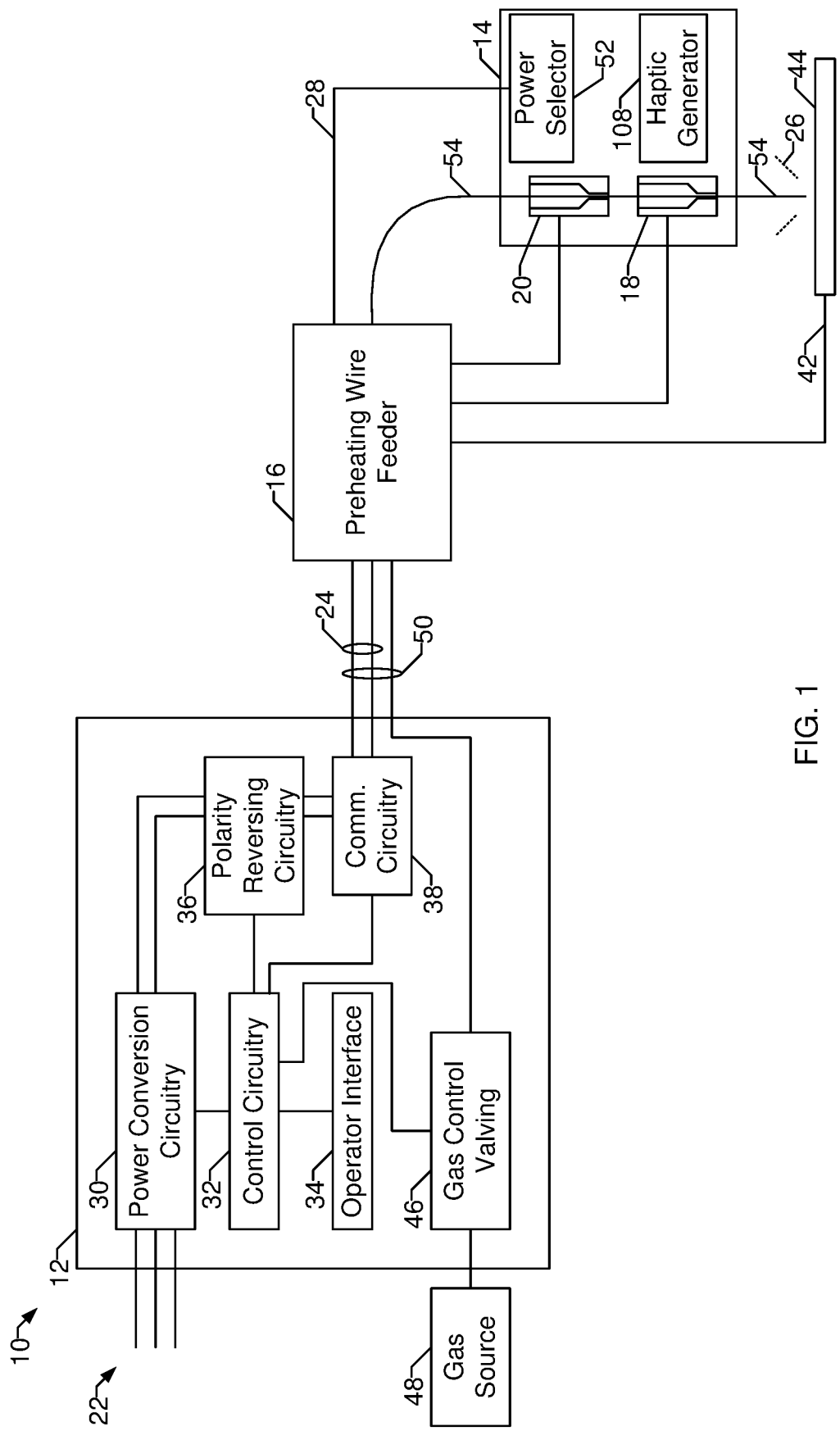
FIG. 1 illustrates an example welding system configured to transfer welding-type power to a welding accessory, such as a preheating wire feeder, for conversion to welding-type output power and preheating power, and to control the welding-type power and the preheating power based on an input signal, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Improving productivity is a common desire for weld operators and supervisors and, as a result, productivity enhancement within welding fabrication a benefit. Improvements in weld operator efficiency can improve overall production efficiency, reduce the effects of shortages in skilled welding labor, reduce project timelines, and/or reduce welding-related project costs.

Disclosed example systems and methods include preheating systems that preheat welding wire (e.g., electrode wire), which has been shown to significantly increase deposition when applied to an open arc wire robotic welding processes. However, in many welding applications, handheld welding by personnel is significantly more prevalent than robotic welding. Handheld welding can enjoy the same benefits of wire preheating as robotic welding, to the point in which the welding operator is the limiting factor on deposition and productivity. In a robotic application, the travel speeds required for maximizing productivity with wire preheating are attainable for a robot. However, in handheld applications, a human weld operator may not be able to travel fast enough within the required joint configurations of a given welding task to achieve an acceptable welding condition.

Disclosed example systems and methods provide operator interface techniques to allow an operator of a handheld welding torch to easily, intuitively, and synergically control welding and preheating parameters during a welding operation. Some examples provide the ability for an operator to adapt welding and/or preheating parameters on-the-fly during a welding operation, such as allowing the operator to switch from a first set of welding parameters that involve preheating the electrode wire, to a conventional wire process that does not involve preheating (and vice versa) via an interface on the welding torch and/or on another welding accessory. For example, the preheating may be used (e.g., at full output or reduced output) for situations in which the operator is ergonomically capable of providing higher travel speeds, such as long, flat, horizontal welds. For other welds, like vertical up, vertical down, welding around corners, and/or other out-of-position welds, disclosed examples enable disabling of the preheating power to accomplish such welds using conventional weld parameters.

In an example of operation of disclosed systems and methods, a weld operator or weld engineer may establish and store one or more weld schedules, or predetermined sets of welding and preheating parameters, on a welding power source and/or a welding accessory (e.g., a wire feeder). In some examples, the welding power source or welding accessory automatically calculates and stores companion weld schedules based on a programmed weld schedule. For example, when a weld operator or weld engineer programs a first weld schedule (e.g., welding voltage, wire feed speed, etc.) based on a given material thickness, wire diameter, wire type, gas type, and/or any other factors that control the parameters for the weld, the control circuitry of the welding power source or welding accessory may automatically calculate and store one or more additional weld schedules, in which the weld parameters set by the weld engineer or weld operator for the weld schedule are adjusted and wire preheating power is added to the weld schedule to improve deposition, reduce hydrogen in the weld wire and/or resulting weldment, and/or achieve other benefits of wire preheating.

When the weld operator desires to recall the stored weld schedule, the operator may select the stored weld schedule via an input device on the weld torch, or via an interface on the welding power source or welding accessory. For example, the weld operator may select a first weld schedule (e.g., the companion weld schedule) that provides the higher deposition and/or other wire preheating benefits (e.g., via enabling wire preheating) for one or more first welding operations on which the weld operator is capable of executing the travel speeds appropriate for a higher deposition rate (e.g., straight welds). The weld operator may select a second weld schedule (e.g., the weld schedule programmed by the weld operator or the weld engineer) that does not include the wire preheating for welding operations on which higher travel speeds are more difficult to reliably achieve. In this manner, the weld operator can quickly alternate between stored weld schedules and improve productivity.

Some example systems and methods further enable synergic control of welding parameters and preheating parameters during welding and/or while not welding. For example, the operator may be provided with a synergic input device that enables the operator to control two or more parameters from the welding torch, such as by modifying the pressure on the trigger. As used herein, the term "synergic control" refers to simultaneous control of two or more welding-related parameters or variables, such as controlling one or more parameters or variables on the basis of a change in another parameter or variable. As used herein, "synergic output" refers to welding and/or preheating power in which two or more variables associated with generating the welding and/or preheating power are controlled according to a specified relationship. Synergic control may be accomplished using a single user input device. An analog or encoded digital signal is output from the synergic input device (e.g., the trigger), and disclosed systems and methods control the welding and/or preheating outputs based on the value of the signal (e.g., within a predetermined range of values). In some examples, the synergic input device may be configured by the operator to correspond to an intuitive result, such as heat input (e.g., increasing heat input by further depressing the trigger or decreasing heat input by reducing pressure on the trigger), deposition, weld penetration, weld/preheat balance, and/or any other result. Disclosed example systems and methods automatically adjust the welding parameters and/or preheating parameters based on the value of the signal.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), submerged arc welding (SAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

FIG. 1 illustrates an example welding system 10 configured to transfer welding-type power to a welding accessory, such as a preheating wire feeder 16, for conversion to welding-type output power and resistive preheating power.

The example welding system 10 of FIG. 1 includes a welding power source 12 and a preheating welding torch 14. The welding torch 14 may be a torch configured for any wire-fed welding process, such as gas metal arc welding (GMAW), flux cored arc welding (FCAW), and/or submerged arc welding (SAW), based on the desired welding application.

The welding power source 12 supplies welding-type power to the preheating wire feeder 16, which converts the input welding-type power to one or both of output welding-type power and/or resistive preheating power, which are output to the welding torch 14. The preheating wire feeder 16 also supplies the filler metal to a welding torch 14 configured for GMAW welding, FCAW welding, or SAW welding.

The welding power source 12 is coupled to a primary power source 22, such as an electrical grid or engine-driven generator that supplies primary power, which may be single-phase or three-phase AC power. The welding power source 12 may process the primary power to output welding-type power for output to the welding torch 14 or the wire feeder 16 via power cables 24. In some examples, the power cables 24 includes multiple terminals, in which one terminal has a positive polarity and another terminal has a negative polarity. Power conversion circuitry 30 converts the primary (e.g., AC) current to welding-type power as either direct current (DC) or AC. The power conversion circuitry 30 may include circuit elements such as transformers, switches, boost converters, inverters, and so forth, capable of converting power as dictated by the demands of the welding system 10. In some embodiments, the power conversion circuitry 30 is configured to convert the primary power to an approximately 80V DC welding-type power to supply the preheating wire feeder 16. Such example input power may be between approximately 50 to 120V DC.

The welding power source 12 includes control circuitry 32 and an operator interface 34. The control circuitry 32 controls the operations of the welding power source 12 and may receive input from the operator interface 34 through which an operator may choose a welding process (e.g., GMAW, FCAW, SAW) and input desired parameters of the input power (e.g., voltages, currents, particular pulsed or non-pulsed welding regimes, and so forth). The control circuitry 32 may be configured to receive and process a plurality of inputs regarding the performance and demands of the system 10.

The welding power source 12 may include polarity reversing circuitry 36 and communications circuitry 38 coupled to the control circuitry 32. The polarity reversing circuitry 36 reverses the polarity of the output welding-type power when directed by the control circuitry 32. For example, some welding processes, such as TIG welding, may enable a desired weld when the electrode has a negative polarity, known as DC electrode negative (DCEN). Other welding processes, such as stick or GMAW welding, may enable a desired weld when the electrode has a positive polarity, known as DC electrode positive (DCEP). When switching between a TIG welding process and a GMAW welding process, the polarity reversing circuitry 36 may be configured to reverse the polarity from DCEN to DCEP. Additionally or alternatively, the operator may simply connect the terminals of the cable 24 to the preheating wire feeder 16 without knowledge of the polarity, such as when the terminals are located a substantial distance from the power source 12. The control circuitry 32 may direct the polarity reversing circuitry 36 to reverse the polarity in response to signals received through the communications circuitry 38.

In some examples, the communications circuitry 38 is configured to communicate with the welding torch 14, the preheating wire feeder 16, and/or other device(s) coupled to the power cables 24. The communications circuitry 38 sends and receives command and/or feedback signals over the welding power cables 24 used to supply the welding-type power. Additionally or alternatively, the communications circuitry 38 communicates wirelessly with the welding torch 14, the preheating wire feeder 16, and/or other device(s).

For some welding processes (e.g., GMAW), a shielding gas is utilized during welding. In the example of FIG. 1, the welding power source 12 includes one or more gas control valves 46 configured to control a gas flow from a gas source 48. The control circuitry 32 controls the gas control valves 46. The welding power source 12 may be coupled to one or multiple gas sources 48 because, for example, some welding processes may utilize different shielding gases than others. In some examples, the welding power source 12 is configured to supply the gas with the input power via a combined input cable 50 (e.g., including the conductors included in the cable 24). In other examples, the gas control valves 46 and gas source 48 may be separate from the welding power source 12. For example, the gas control valves 46 may be disposed within the preheating wire feeder 16, as described below with reference to FIG. 2.

The preheating wire feeder 16 receives the welding-type power as an input via input terminals configured to couple with the terminals of the power cables 24. The example preheating wire feeder 16 of FIG. 1 is coupled to a preheating GMAW torch 14 configured to supply the gas, electrode wire 54, and electrical power to the welding application. As discussed in more detail below, the preheating wire feeder 16 is configured to receive input welding-type power from the power source 12, convert a first portion of the input welding-type power to second welding-type power and output the second welding-type power to a weld circuit, and convert a second portion of the input welding-type power to preheating power and output the preheating power to a preheating circuit.

The example torch 14 includes a first contact tip 18 and a second contact tip 20. The electrode wire 54 is fed from the preheating wire feeder 16 to the torch 14 and through the contact tips 18, 20, to produce a welding arc 26 between the electrode wire 54 and the workpiece 44. The preheating circuit includes the first contact tip 18, the second contact tip 20, and a portion of the electrode wire 54 that is located between the first contact tip 18 and a second contact tip 20. The example preheating wire feeder 16 is further coupled to a work cable 42 that is coupled to the workpiece 44.

In operation, the electrode wire 54 passes through the second contact tip 20 and the first contact tip 18, between which the preheating wire feeder 16 outputs a preheating current to heat the electrode wire 54. Specifically, in the configuration shown in FIG. 1, the preheating current enters the electrode wire 54 via the second contact tip 20 and exits via the first contact tip 18. However, the preheating current may be conducted in the opposite direction. At the first contact tip 18, a welding current may also enter (or exit) the electrode wire 54. The welding current is output by the preheating wire feeder 16, which derives the preheating power and the welding-type power from the welding-type power supplied by the power source 12. The welding current exits the electrode wire 54 via the workpiece 44, which in turn generates the welding arc 26. When the electrode wire 54 makes contact with the workpiece 44, an electrical circuit is completed and the welding current flows through the electrode wire 54, across the metal work piece(s) 44, and returns to the preheating wire feeder 16. The welding current causes the electrode wire 54 and the parent metal of the work piece(s) 44 in contact with the electrode wire 54 to melt, thereby joining the work pieces as the melt solidifies. By preheating the electrode wire 54, the welding arc 26 may be generated with drastically reduced arc energy. Generally speaking, the preheating current is inversely proportional to the distance between the contact tips 18, 20 and/or directly proportional the electrode wire 54 diameter.

Figure 2:
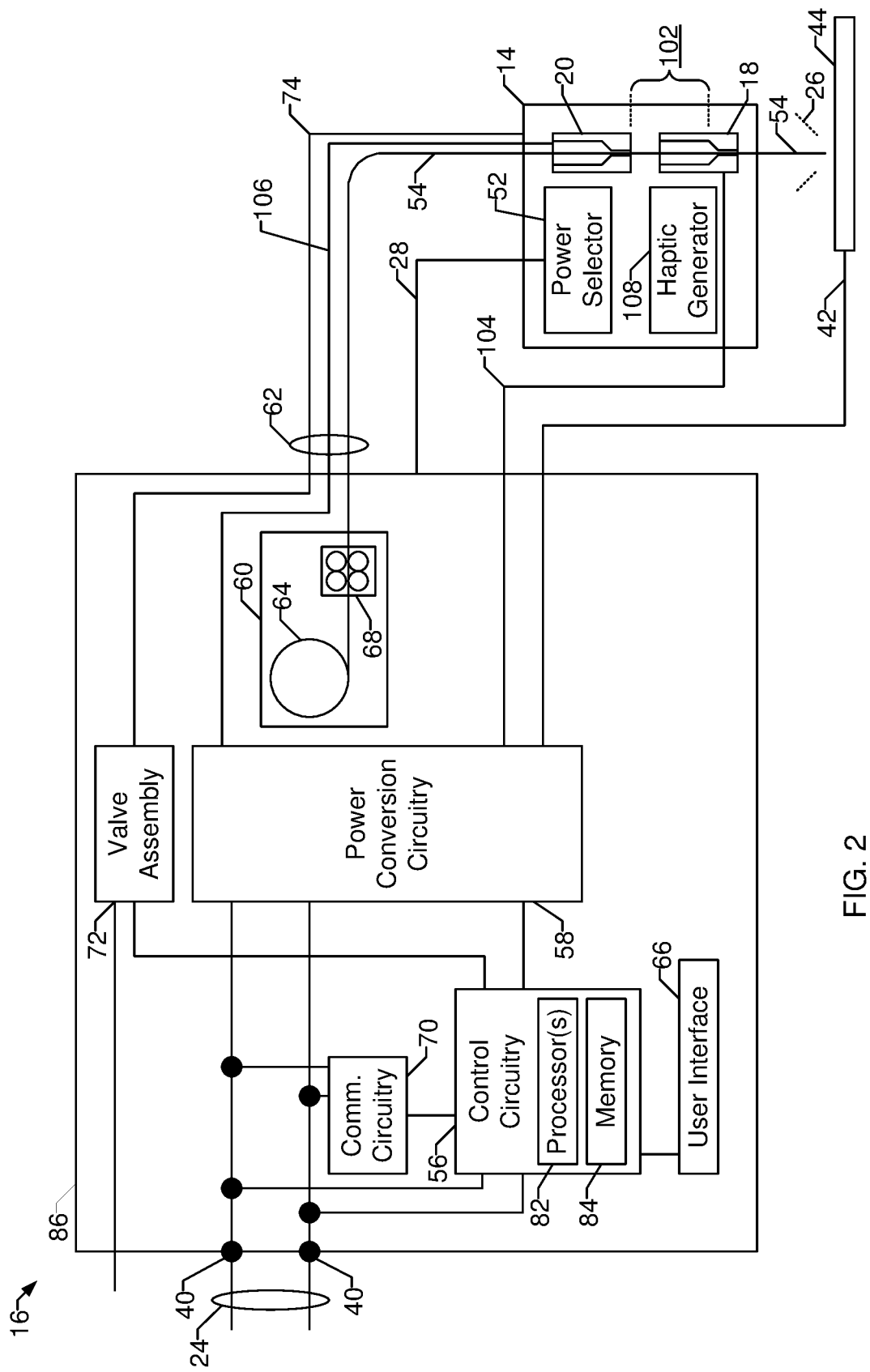
FIG. 2 is a block diagram of an example implementation of the preheating wire feeder of FIG. 1.

FIG. 2 is a block diagram of an example implementation of the preheating wire feeder 16 of FIG. 1. The example preheating wire feeder 16 receives welding-type power as an input, and converts the welding-type power to welding-type power and/or preheating power. For example, the preheating wire feeder 16 may output welding-type power and preheating power simultaneously, alternate outputting the welding-type power and the preheating power, and/or output only one of welding-type power or preheating power at a given time, based on the welding task and/or operator experience.

The preheating wire feeder 16 receives the input power from the welding power source 12 of FIG. 1 via input terminals 40 coupled to control circuitry 56. The preheating wire feeder 16 may be operated remotely from the welding power source 12 with relatively long power cables coupling the preheating wire feeder 16 to the welding power source 12.

The control circuitry 56 includes one or more controller(s) and/or processor(s) 82 that controls the operations of the preheating wire feeder 16. The control circuitry 56 receives and processes multiple inputs associated with the performance and demands of the system. The processor(s) 82 may include one or more microprocessors, such as one or more "general-purpose" microprocessors, one or more special-purpose microprocessors and/or ASICS, one or more microcontrollers, and/or any other type of processing and/or logic device. For example, the control circuitry 56 may include one or more digital signal processors (DSPs). The control circuitry 56 may include circuitry such as relay circuitry, voltage and current sensing circuitry, power storage circuitry, and/or other circuitry, and is configured to sense the input power received by the preheating wire feeder 16.

The example control circuitry 56 includes one or more memory device(s) 84. The memory device(s) 84 may include volatile and/or nonvolatile memory and/or storage devices, such as random access memory (RAM), read only memory (ROM), flash memory, hard drives, solid state storage, and/or any other suitable optical, magnetic, and/or solid-state storage mediums. The memory device(s) 84 store data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth. The memory device 84 may store machine executable instructions (e.g., firmware or software) for execution by the processor(s) 82. Additionally or alternatively, one or more control schemes for various welding processes, along with associated settings and parameters, may be stored in the memory device(s) 84, along with machine executable instructions configured to provide a specific output (e.g., initiate wire feed, enable gas flow, capture welding data, detect short circuit parameters, determine amount of spatter) during operation.

The preheating wire feeder 16 further includes power conversion circuitry 58. The power conversion circuitry 58 is configured to convert a first portion of the input welding-type power to second welding-type power and convert a second portion of the input welding-type power to preheating power. The first and second portions of the input welding-type power may be divided by time (e.g., the first portion is used at a first time and the second portion is used at a second time) and/or as portions of the total delivered power at a given time. The power conversion circuitry 58 outputs the second welding-type power to a weld circuit, and outputs the preheating power to a preheating circuit. Both the weld circuit and the preheating circuit may be implemented using the welding torch 14.

The power conversion circuitry 58 may include circuit elements such as boost converters, buck converters, half-bridge converters, full-bridge converters, forward converters, flyback converters, an internal bus, bus capacitor, voltage and current sensors, and/or any other topologies and/or circuitry to convert the input power to the welding power and the preheating power, and to output the welding power and the preheating power to the torch 14. In some examples, input power received by the preheating wire feeder 16 is a DC voltage between approximately 20V to 120V, approximately 40V to 100V, or approximately 60V to 80V. As used in reference to the input power, the term approximately may mean within 5 volts or within 10 percent of the desired voltage.

The power conversion circuitry 58 may be configured to convert the input power to any conventional and/or future welding-type output. The example power conversion circuitry 58 may implement one or more controlled voltage control loop(s) and/or one or more controlled current control loop(s) to control the voltage and/or current output to the welding circuit and/or to the preheating circuit. As described in more detail below, the power conversion circuitry 58 may be implemented using one or more converter circuits, such as multiple converter circuits in which each of the welding-type output and the preheating output is produced using separate ones of the converter circuits.

In some examples, the power conversion circuitry 58 is configured to convert the input power to a controlled waveform welding output, such as a pulsed welding process or a short circuit welding process (e.g., regulated metal deposition (RMD™)). The power conversion circuitry 58 disposed within the preheating wire feeder 16 supplies the controlled waveform welding output for the welding application without attenuation from the power cable between the welding power source and the preheating wire feeder 16. This increases the response time and accuracy of the controlled waveform welding output supplied to the welding torch. Increasing the response time of the controlled waveform welding output may ensure that the desired welding output waveform is supplied to welding torch at specific times during the weld. For example, the RMD™ welding process utilizes a controlled waveform welding output having a current waveform that varies at specific points in time over a short circuit cycle. Increasing the response time of the controlled waveform welding output may also improve the timing of the waveform pulses to produce a desired weld.

In some examples, the power conversion circuitry 58 is configured to provide the welding output to the wire feed assembly 60. The wire feed assembly 60 supplies electrode wire 54 to the welding torch for the welding operation. The wire feed assembly 60 includes elements such as a wire spool 64 and a wire feed drive configured to power drive rolls 68. The wire feed assembly 60 feeds electrode wire 54 to the welding torch along a weld cable 62. The welding output may be supplied through the weld cable 62 coupled to the welding torch and/or the work cable 42 coupled to the workpiece 44.

The example preheating wire feeder 16 includes a user interface 66 for control of parameters of the welding system 10. The user interface 66 is coupled to the control circuitry 56 for operator selection and adjustment of the welding process (e.g., pulsed, short-circuit, FCAW) through selection of the wire size, wire type, material, and gas parameters. The user interface 66 is coupled to the control circuitry 56 for control of the voltage, amperage, wire feed speed, and arc length for a welding application. The user interface 66 may receive inputs using any input device, such as via a keypad, keyboard, buttons, touch screen, voice activation system, wireless device, etc.

The user interface 66 may receive inputs specifying wire material (e.g., steel, aluminum), wire type (e.g., solid, cored), wire diameter, gas type, and/or any other parameters. Upon receiving the input, the control circuitry 56 determines the welding output for the welding application. For example, the control circuitry 56 may determine weld voltage, weld current, wire feed speed, inductance, weld pulse width, relative pulse amplitude, wave shape, preheating voltage, preheating current, preheating pulse, preheating resistance, preheating energy input, and/or any other welding and/or preheating parameters for a welding process based at least in part on the input received through the user interface 66.

The example preheating wire feeder 16 further includes communications circuitry 70 coupled to the control circuitry 56 to send and receive command and/or feedback signals over the power cable used to provide the input power to the preheating wire feeder. The communications circuitry 70 may further enable the user interface 66 to control the welding power source. For example, the user interface 66 may be configured to control the amperage, voltage, or other parameters of the input power supplied by the welding power source 12. In some examples, the control circuitry 56 controls the welding power source 12 from a location remote from the welding power source 12, without being restricted to parameters set on the operator interface 34 (FIG. 1). That is, the control circuitry 56 and communications circuitry 70 enable an operator to control the welding power source 12 remotely through the preheating wire feeder 16 with equal control priority to the operator interface 34 of the welding power source.

The communications circuitry 70 may communicate data to other devices in the system 10 of FIG. 1 via wireless connections. Additionally or alternatively, the communications circuitry 70 communicates with other welding devices using one or more wired connections, such as by using a network interface controller (NIC) to communicate data via a network (e.g., ETHERNET, 10baseT, 10base100, etc.), and/or communications via the terminals 40 through which the welding-type input power is received. Example implementations of the communications circuitry 70 are described in U.S. Pat. No. 9,012,807. The entirety of U.S. Pat. No. 9,012,807 is incorporated herein by reference. However, other implementations of the communications circuitry 70 may be used.

In the illustrated example wire feeder 16, a valve assembly 72 is included for providing gas to the welding torch 14 along a gas line 74. The valve assembly 72 may be controlled by the control circuitry 56. For example, the valve assembly 72 may be configured to supply gas to the welding torch 14 prior to and after a welding task. In some examples, the valve assembly 72 is configured to purge the gas line 74 upon receiving a purge command from the user interface 66.

During operation, the power conversion circuitry 58 establishes a welding circuit to conduct welding current from the power conversion circuitry 58 to the first contact tip 18, and returns to the power conversion circuitry 58 via the welding arc 26, the workpiece 44, and the work cable 42.

During operation, the power conversion circuitry 58 establishes a preheating circuit to conduct preheating current through a section 102 of the electrode wire 54. The preheating current flows from the power conversion circuitry 58 to the second contact tip 20 via a first cable 106, through the section 102 of the electrode wire 54 to the first contact tip 18, and returns to the power conversion circuitry 58 via a second cable 104 connecting the power conversion circuitry 58 to the first contact tip 18. Either, both, or neither of the cables 104, 106 may be combined with other cables and/or conduits. For example, the cable 104 and/or the cable 106 may be part of the cable 62. In other examples, the cable 106 is included within the cable 62, and the cable 104 is routed separately to the torch 14. To this end, the preheating wire feeder 16 may include between one and three terminals to which one or more cables can be physically connected to establish the preheating, welding, and work connections. For example, multiple connections can be implemented into a single terminal using appropriate insulation between different connections.

Because the preheating current path is superimposed with the welding current path over the connection between the first contact tip 18 and the power conversion circuitry 58 (e.g., via cable 104), the cable 104 may enable a more cost-effective single connection between the first contact tip 18 and the power conversion circuitry 58 (e.g., a single cable) than providing separate connections for the welding current to the first contact tip 18 and for the preheating current to the first contact tip 18.

The example preheating wire feeder 16 includes a housing 86, within which the control circuitry 56, the power conversion circuitry 58, the wire feed assembly 60, the user interface 66, the communications circuitry 70, and/or the valve assembly 72 are enclosed. In examples in which the power conversion circuitry 58 includes multiple power conversion circuits (e.g., a preheating power conversion circuit and a welding power conversion circuit), all of the power conversion is performed within the housing 86.

In some other examples, instead of providing the welding-type power directly to the preheating wire feeder 16 via the two conductors as in the example system 10 of FIG. 1, the example preheating wire feeder 16 is coupled to the power source 12 via one conductor (e.g., via a positive or negative connection) in a manner similar to a conventional voltage sensing wire feeder. The power source 12 is coupled to the workpiece 44 via a work cable to enable the completion of the weld circuit. To provide communications, voltage sensing, and/or preheating power, the preheating wire feeder is also coupled to the workpiece 44 via a voltage sense lead. Because the voltage sense lead is not part of the weld circuit and does not conduct weld current, the voltage sense lead may be designed to conduct less current than the work cable 42. However, the voltage sense lead is configured to withstand sufficient current to provide power to preheating power conversion circuitry, communications circuitry, control circuitry, and/or wire feeding hardware. The example preheating wire feeder 16 converts at least a portion of the power received from the power source 12 to preheating power. The preheating wire feeder 16 outputs the preheating power to the first and second contact tips 18, 20 via conductors, and is further configured to pass welding-type power through to the first contact tip 18 to generate the welding arc 26 via the conductor and/or a separate conductor and/or cable. One or more of the conductors carrying preheating and/or welding current may be combined into a cable with the wire liner conducting the electrode wire 54, and/or with a gas line conducting shielding gas to the welding torch 14.

In the examples of FIGS. 1 and 2, the example torch 14 includes a power selector circuitry 52 to permit the user of the torch (e.g., the welder) to make adjustments to the welding output and/or preheating output from the torch 14 in a synergic manner. For example, as the user makes adjustments via the power selector circuitry 52, the power source 12 and the wire feeder 16 synergically change the weld output power (e.g., weld output voltage, arc voltage, weld current, etc.), preheating power (e.g., preheating voltage, preheating current, target wire temperature, preheating heat input, target wire resistance, etc.) and/or the wire feed speed of the weld.

An example implementation of the power selector circuitry 52 is a pressure-sensitive trigger. For instance, the torch 14 may include the same trigger used in conventional welding-type torches, modified to provide an analog signal or encoded digital signal to represent an amount of input to the trigger. In some examples, the operator may incrementally depress the trigger (e.g., apply more pressure) to change the balance between welding power and preheating power, to increase the overall power applied to the weld, and/or to increase deposition speed, and/or incrementally release the trigger (e.g., apply less pressure) to change the balance between welding power and preheating power, to decrease the overall power applied to the weld, and/or to decrease deposition speed. Alternative implementations of the power selector circuitry 52 include a wheel, a dial, a knob, a foot pedal, a slide, and/or any other input device that generates the signal (e.g., via an encoder, a potentiometer, etc.) configured to output the signal and positioned to enable an operator to manipulate the input while welding (e.g., while simultaneously holding the trigger).

The power selector circuitry 52 outputs a control signal to the control circuitry 32 of the power source 12 (e.g., via the communication circuitry 38) and/or to the control circuitry 56 of the wire feeder 16 (e.g., via one or more of the cables 104, 106 and/or via the electrode wire 54, or via a separate control cable). The control signal may be an analog or digital signal that represents the output from the power selector circuitry 52. The control circuitry 32 identifies a user input (e.g., an input from the power selector circuitry 52) during a welding-type operation involving welding-type power and/or preheating power. The control circuitry 32 determines, based on the user input, a voltage adjustment for the welding-type power, an adjustment to the preheating power, and/or a wire feed speed adjustment. For example, the control circuitry 32 may reference a synergic control scheme, such as an algorithm or a lookup table, to determine a voltage setpoint, a preheating setpoint, and/or a wire feed speed setpoint corresponding to the user input. A lookup table may be stored in, for example, the memory 84 of the control circuitry 56, and/or a similar memory or storage device of the control circuitry 32.

The example control circuitry 56 and/or the communications circuitry 70 of the wire feeder 16 may generate one or more control signals to control the welding power source 12 to perform an output adjustment (e.g., to change the power input to the wire feeder 16), to control the power conversion circuitry 58 to modify the welding-type power and/or the preheating power output to the torch 14, and to control the wire feed assembly 60 to perform a wire feed speed adjustment.

A user may select (e.g., via the operator interface 34, user interface 66, and/or the power selector circuitry 52) from multiple synergic control schemes that can be controlled via the power selector circuitry 52. An example synergic control scheme involves controlling a balance between welding output and preheating output from the power conversion circuitry 58 based on the control signal from the power selector circuitry 52 while maintaining a constant target heat input to the weld. For example, the control circuitry 56 may control the power conversion circuitry 58 to increase the welding output and to decrease the preheating output in response to an increase (or decrease) in pressure on a trigger, and control the power conversion circuitry 58 to decrease the welding output and to increase the preheating output in response to an increase (or decrease) in pressure on a trigger. Changing the balance of welding and preheating power while maintaining a consistent heat input may, for example, change the penetration of the weld and/or the deposition rate. For example, controlling the balance may be configured such that increasing the trigger pressure increases the deposition rate or increases the penetration rate, such that the operator can consider the trigger to control a result-based parameter (e.g., penetration rate or deposition rate).

Another example synergic control scheme that may be selected involves controlling the welding output and the preheating output to increase or decrease the heat input to the weld in response to a change in the signal from the power selector circuitry 52. For example, as the operator increases pressure on a trigger (or manipulates another input device), the control circuitry 32 controls the power conversion circuitry 58 to increase the preheating output, the welding output, and/or the wire feed speed, to increase the heat input to the weld. Conversely, as the operator decreases pressure on the trigger (or manipulates another input device), the control circuitry 32 controls the power conversion circuitry 58 to decrease the preheating output, the welding output, and/or the wire feed speed, to decrease the heat input to the weld.

In some examples, the synergic control of the voltage and the wire feed speed causes the control circuitry 32 to change a deposition mode in response to the user input via the power selector circuitry 52. For example, GMAW deposition modes, such as an arcless hotwire mode, a regulated metal deposition mode, a controlled short circuit mode, a short arc mode, a pulse spray mode, or a spray transfer mode, typically correspond to different voltage ranges (with some overlap between some modes).

In some examples, the control circuitry 32 implements a trigger hold feature that enables the operator to set a particular synergic output (e.g., welding output and/or preheating output). When the trigger hold is engaged, the operator may release the power selector circuitry 52 (e.g., resulting in a normalized value of the control signal falling to less than a threshold value associated with outputting welding-type power), and the control circuitry 32 continues to maintain the synergic output using a hold value of the control signal 28. In some examples, the trigger hold is engaged after a substantially constant output (e.g., less than a threshold deviation) is sustained for a threshold time period. Additionally or alternatively, the torch 14, the wire feeder 16, and/or any other device may include an input device (e.g., a button, switch, etc.) that provides a control signal hold command to the control circuitry 32. When the trigger hold is engaged, such as the operator releasing the power selector circuitry 52, the control circuitry 32 determines the appropriate synergic output and controls the power conversion circuitry 30 and the wire feeder 104 based on the hold value determined in association with the control signal hold command. For example, the hold value may be determined using a value at which the operator held the power selector circuitry 52 for a threshold period of time to generate the control signal hold command, and/or a value of the control signal 28 at the time the control signal hold command was generated.

The control circuitry 32 may cause the trigger hold feature to time out, and disable the trigger hold feature, in response to the operator not using the trigger hold function within a threshold time period. For example, if the operator is unaware that the trigger hold feature is available or ready to be engaged, the operator may not intend to continue the welding-type operation in response to releasing the trigger of the welding torch 14. In other cases, the operator may not desire to use the trigger hold, and instead prefers to continue using (e.g., varying) the synergic output during the welding-type operation.

In some examples, the control circuitry 32 responds to the control signal hold command by outputting a perceptible alert to inform the operator that the trigger hold may be engaged (e.g., when the power selector circuitry 52 is released). Example alerts may include a visual alert, an audible alert, a haptic alert, and/or any other type of perceptible feedback. Example trigger hold feedback may include, for example, an audible signal (e.g., a beep, tone, audible message, and/or any other audible feedback via a speaker in the power supply 102, the wire feeder 104, the torch 14, a helmet of the operator, and/or any other speaker), a visual signal (e.g., a light, LED, display, and/or any other visual feedback via the power supply 12, the wire feeder 16, the torch 14, a helmet of the operator, and/or any other visual device), haptic feedback (e.g., a tactile or other haptic feedback at the torch 14 or other location which can be perceived by the operator), and/or any other form of feedback. The trigger hold feedback signal conveys to the operator that the trigger hold function is engaged at the present synergic output level, should the operator choose to use the trigger hold function (e.g., by releasing the trigger or other variable input device). In some examples, the torch 14 includes a haptic generator 108, such as a vibration motor, an eccentric rotating mass actuator, a piezoelectric actuator, and/or any other type of haptic generator, to create haptic feedback to the operator, and the control circuitry 32 is configured to output a haptic feedback signal to control the vibration motor, in response to the control signal hold command.

In some examples, the control circuitry 32 may generate a feedback control signal to alert the operator of one or more events during the welding operation. The feedback control signal may be used to control devices internal to the power supply 12 (e.g., a display of the operator interface 34, a speaker of the operator interface 34, etc.) and/or devices external to the power supply 12 (e.g., devices in an operator helmet, a display at the user interface 66, at the torch 14, at the wire feeder 16, etc.). Example events are associated with the synergic control by the operator, such as alerting the operator when the value of the control signal 28 is outside of a predetermined range, or window, of values. The predetermined range of values may be defined by the operator and/or determined by the control circuitry 32 using welding parameters (e.g., physical parameters of the weld, etc.), preheating parameters (e.g., a distance between the contact tips 18, 20, a diameter of the wire 54, a material of the wire 54, a target preheating temperature or enthalpy, etc.) a weld procedure specification (WPS), and/or any other information.

Other example events associated with the synergic control include feedback representative of the value of the control signal 28 and/or of the synergic output (e.g., the power, voltage, and/or wire feed speed). For example, the control circuitry 32 may control the haptic generator 108 to increase the strength and/or frequency of the haptic feedback proportionally (or inversely proportional) to the control signal and/or the synergic output, change a haptic feedback pattern based on a characteristic of the synergic output (e.g., the deposition mode, whether the control signal is within a subrange of the input value range, etc.). Additionally or alternatively, the control circuitry 32 may output, based on the value of the control signal and/or the synergic output, audio that increases in amplitude, frequency, and/or any other characteristic. The audio-based output may be, for example, a speaker or buzzer on the power supply 12, the wire feeder 16, the torch 14, a helmet worn by the operator, and/or a separate device. Additionally or alternatively, the control circuitry 32 may output the audio feedback using arc-based audio, using techniques such as those disclosed in U.S. Patent Publication No. 2019/0015920 (Knoener et al.), filed Jul. 12, 2017, entitled "Methods and Apparatus to Communicate via a Welding Arc." The entirety of U.S. Patent Publication No. 2019/0015920 is incorporated herein by reference.

In some examples, the control circuitry 32 controls visual feedback (e.g., an LED, a blinking light, a graphic on the display 116, etc.) that changes in color, graphic, blinking frequency, and/or any other visual feedback technique. For example, the control circuitry 32 may update a graphic on the display 116 that illustrates the value of the control signal 28 and/or the synergic output (e.g., power, voltage, and/or wire feed speed) within a range. The range may specify upper and lower limits of the synergic output and/or the input value range of the control signal 28, and an indicator illustrating the current input signal or synergic output is displayed with respect to the graphic. The range may be based on, for example, the physical characteristics of the welding operation, an operator-selected range, and/or any other variables.

In still other examples, the control circuitry 32 may output the feedback control signal in response to a change in the control of the synergic output, such as when changing from a first subrange of the input value range to a second subrange of the input value range, when changing deposition modes, and/or any other change that may be implemented by the operator using the power selector circuitry 52. For example, if the operator reduces pressure on a trigger to reduce synergic output, the control circuitry 32 may generate the feedback control signal in response to the control signal 28 traversing a threshold point (e.g., a threshold value of the control signal 28) representing a change in control.

The example control circuitry 32 may also filter the control signal 28 to avoid unintended changes in the synergic output caused by difficulty in maintaining the power selector circuitry 52 in a steady position. For example, the control circuitry 32 may filter the control signal 28 to reduce the influence of short-term or transient changes in the synergic output. An example filter technique may involve determining the synergic output using a set of most recent samples of the control signal 28, and applying weights to the samples of the control signal 28 based on the age of the samples. Thus, older samples are more heavily weighted in the determination of the synergic output than the more recent samples. In some such examples, the weights may have a rapid increase after a threshold age of the samples, such that samples measured less than a threshold time prior are weighted very low and samples measured more than the threshold time prior are weighted substantially higher.

Another example technique that may be used involves determining a filtering subrange of values of the control signal 28 based on the value of the control signal 28 at a given time. While the value of the control signal 28 at subsequent times remains within the filtering subrange of values, the control circuitry 32 synergically controls the voltage of the welding-type power and the wire feed speed based on the value of the control signal 28 used to determine the filtering subrange.

In some examples, the control circuitry 32 maps the range of values of the control signal 28, or a subrange of the values, to an entire range of output power of which the welding-type system 10 is capable. In other examples, the range of values of the control signal 28 is mapped to a subrange of the synergic output and/or subranges of variables (e.g., voltage and wire feed speed) involved in generating the synergic output. For example, the control circuitry 32 may determine a recommended range and/or a permissible range of synergic output based on the physical characteristics of the welding operation and/or preheating characteristics of the welding operation. The physical characteristics and/or the preheating characteristics of the welding operation may be input via the operator interface 34. Based on the determined range, the control circuitry 32 maps the recommended range and/or a permissible range of synergic output to the range of values of the control signal 28 such that the synergic output cannot go outside of the mapped subrange of the synergic output. Example physical characteristics that may be used to determine the subrange of synergic output may include a workpiece thickness, a workpiece material, a wire composition, a wire diameter, and/or a shielding gas composition. Example preheating characteristics that may be used to determine the subrange of the synergic output may include a preheating distance (e.g., a distance of the section 102 between the contact tips 18, 20), a diameter of the wire 54, a material of the wire 54, a target preheating temperature or enthalpy, and/or a balance between welding power and preheating power. By mapping the range of values of the control signal 28 to a subrange that is determined to be recommended or permissible for the physical characteristics and/or the preheating characteristics of the welding operation, the operator may be prevented from using a synergic output that is not recommended for the particular physical characteristics and/or the preheating characteristics of the weld, thereby improving weld quality and reducing errors and/or rework.

Additionally or alternatively, the control circuitry 32 may map subranges of the control signal 28 to separate subranges of synergic output, in which the subranges of the control signal 28 are not equally wide and/or the subranges of the synergic output are not equally wide. In this manner, the control circuitry 32 may enable an operator to have a higher degree of control of the synergic output in a portion of interest of the range of the power selector circuitry 52 (e.g., a portion of the travel range of a trigger or foot pedal) than in another portion.

In some examples, the power selector circuitry 52 enables selection of one or more weld schedules, or predefined sets of parameters. Example weld schedules may be configured via the operator interface 34 and/or the user interface 66 to specify any combination of welding and/or preheating parameters, and recalled via the power selector circuitry 52. For example, the power selector circuitry 52 may include selection buttons to toggle between two or more weld schedules, or may change weld schedules in response to a predetermined input via a trigger (e.g., a trigger pull for less than a threshold time). Example parameters that may be specified as part of a weld schedule include welding voltage, wire feed speed, welding current, heat input, preheating voltage, preheating current, preheating resistance, preheating power, preheating heat input, pulse parameters, advanced waveform controls, AC balance, AC frequency, material thickness, wire type, and/or any other desired parameters.

The example control circuitry 32, 56 may automatically calculate and store companion weld schedules based on a programmed weld schedule. For example, when a first weld schedule (e.g., welding voltage, wire feed speed, etc.) is entered into the control circuitry (e.g., via the operator interface 34 or the user interface 66), the control circuitry 32, 56 automatically calculates and store one or more additional, companion weld schedules. For example, a weld operator or weld engineer may program a first weld schedule based on a given material thickness, wire diameter, wire type, gas type, and/or any other factors that control the parameters for the weld, and/or which may be specified in a weld procedure specification (WPS) or similar document. Based on conversion data stored in the control circuitry (e.g., in the memory 84), the control circuitry 32, 56 generates a second weld schedule based on the same weld parameters (e.g., material thickness, wire diameter, wire type, gas type, and/or any other factors). The control circuitry 32, 56 generates the second weld schedule by including non-zero preheating power (e.g., a preheating temperature, a preheating voltage, a target wire resistance, etc.) and adjusts the weld parameters (e.g., weld voltage, wire feed speed, inductance, pulse parameters, AC parameters, etc.) of the first weld schedule to compensate for the added preheating power.

As an example generation of a second weld schedule, a first example weld schedule programmed by the operator may specify a weld voltage of 22 volts and a weld current of 245 amperes, with no preheating (e.g., preheating off). Based on stored conversion data, the example control circuitry 32, 56 may generate a second weld schedule using a weld voltage of 18 volts and a weld current of 266 amperes, with a preheating voltage of 4 voltage and a preheating current of 150 amperes. The operator may then switch between the first and second weld schedules, and/or may quickly recall the first and/or second weld schedules, while welding and/or not welding.

The example control circuitry 32, 56 may select the preheating parameters for the second weld schedule to improve deposition, reduce hydrogen in the weld wire and/or resulting weldment, and/or achieve other benefits of wire preheating, relative to the first weld schedule. The control circuitry 32, 56 may generate and store multiple companion weld schedules to achieve different effects (e.g., hydrogen reduction, increased deposition, etc.) and/or different degrees of preheating effects (e.g., higher deposition, highest deposition, etc.).

In an example of operation involving weld schedules, a weld operator may select a first weld schedule via the power selector circuitry 52 on the torch 14, on the operator interface 34, and/or on the user interface 66. For example, the operator may pick up the torch 14 and tap the trigger one or more times to operate the power selector circuitry 52. The example first weld schedule specifies a first weld power and a first preheating power. In response to the selection of the weld schedule, the control circuitry 32 (or the control circuitry 56) controls the power conversion circuitry 30 (or the power conversion circuitry 58), as well as any other welding accessories (e.g., a wire feeder, the wire feed assembly 60, etc.) in accordance with the parameters specified in the first weld schedule during the welding operation.

At a later time, the operator selects a second weld schedule via the power selector circuitry 52 on the torch 14, on the operator interface 34, and/or on the user interface 66. For example, the operator may tap the trigger one or more times to operate the power selector circuitry 52 to select the second weld schedule. As the operator toggles the weld schedules, the operator interface 34, the user interface 66, and/or an interface on the torch 14 (e.g., one or more indicators, a display screen, etc.) may display an indication of the selected weld schedule and/or one or more parameters associated with the selected weld schedule (e.g., a weld/preheat balance, a workpiece thickness, a weld voltage and wire feed speed, a preheating power, etc.).

While the examples of FIGS. 1 and 2 include power conversion circuitry that outputs both welding power and preheating power, other examples may involve multiple, separate welding-type power supplies that separately provide the welding-type power and the preheating power. Examples of such systems are disclosed in U.S. patent application Ser. No. 15/343,992, filed Nov. 4, 2016, entitled "Systems, Methods, and Apparatus to Preheat Welding Wire," and U.S. patent application Ser. No. 16/005,139, filed Jun. 11, 2018, entitled "Systems, Methods, and Apparatus to Preheat Welding Wire for Low Hydrogen Welding." The entireties of U.S. patent application Ser. No. 15/343,992 and U.S. patent application Ser. No. 16/005,139 are incorporated herein by reference. In such examples, the power selector circuitry 52 may control multiple welding-type power sources that separately provide the welding and preheating power, and/or the control circuitry 32, 56 may control communications between the multiple power sources to control welding parameters and/or preheating parameters at the multiple power sources.

Figure 3:
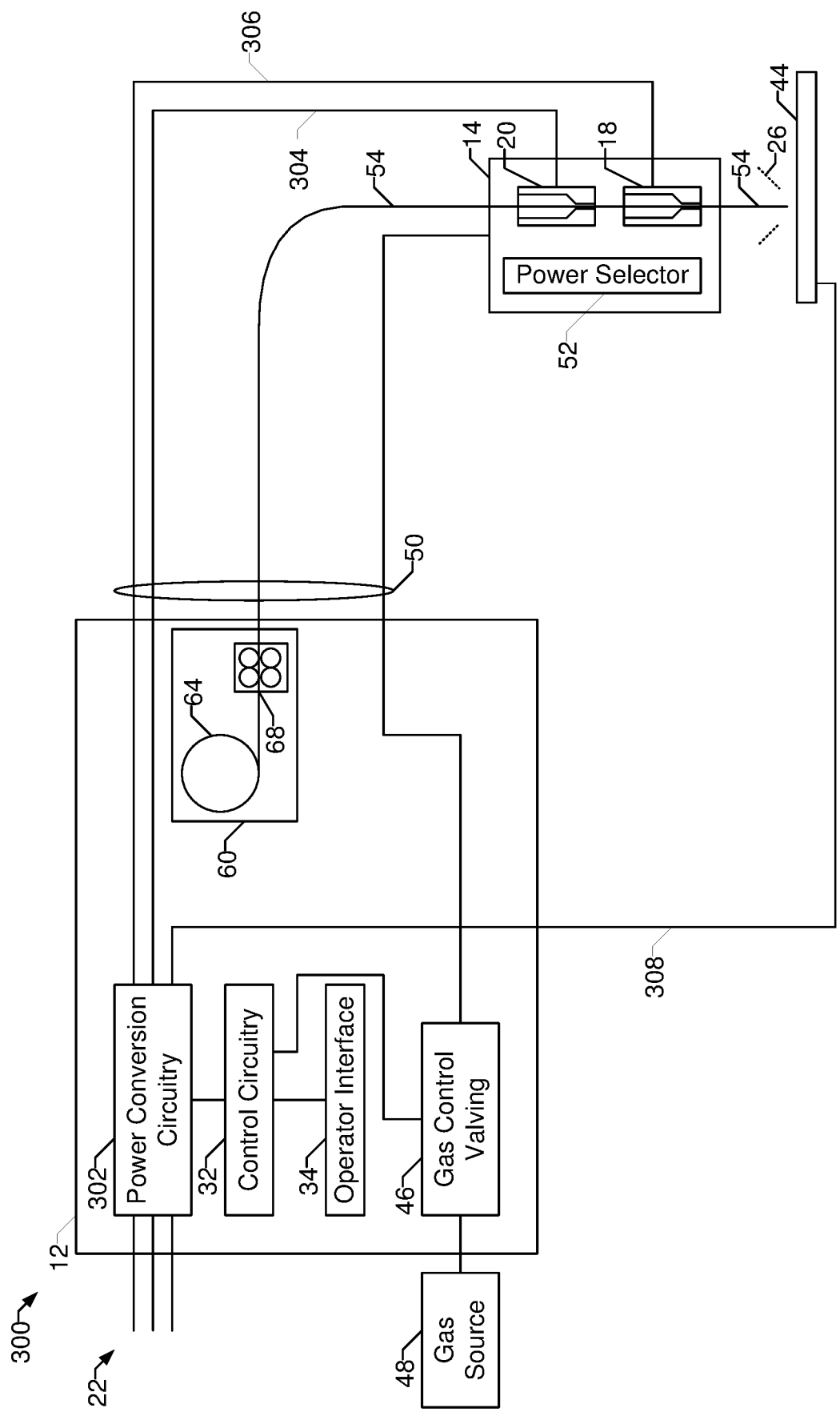
FIG. 3 illustrates another example welding system configured to welding-type output power and preheating power to a welding torch, and to control the welding-type power and the preheating power based on an input signal, in accordance with aspects of this disclosure.

FIG. 3 illustrates another example power source 300 configured to welding-type output power and preheating power to the welding torch 14, and to control the welding-type power and the preheating power based on an input signal. The example welding system 300 includes power conversion circuitry 302, the control circuitry 32, the operator interface 34, the gas control valving 46, and the wire feed assembly 60.

Instead of providing the welding-type power directly to the preheating wire feeder 16 via the two conductors as in the example system 10 of FIG. 1, the example power source 300 includes power conversion circuitry 302 coupled to the torch 14 via output conductors 304, 306, and to the workpiece 44 via a work cable 308 to enable the completion of the circuit. The example power conversion circuitry 302 of FIG. 3 receives input power from the primary power source 22 and outputs the welding-type power and the preheating power to the torch 14 via the conductors 304, 306 and/or the work cable 308.

Figure 4:
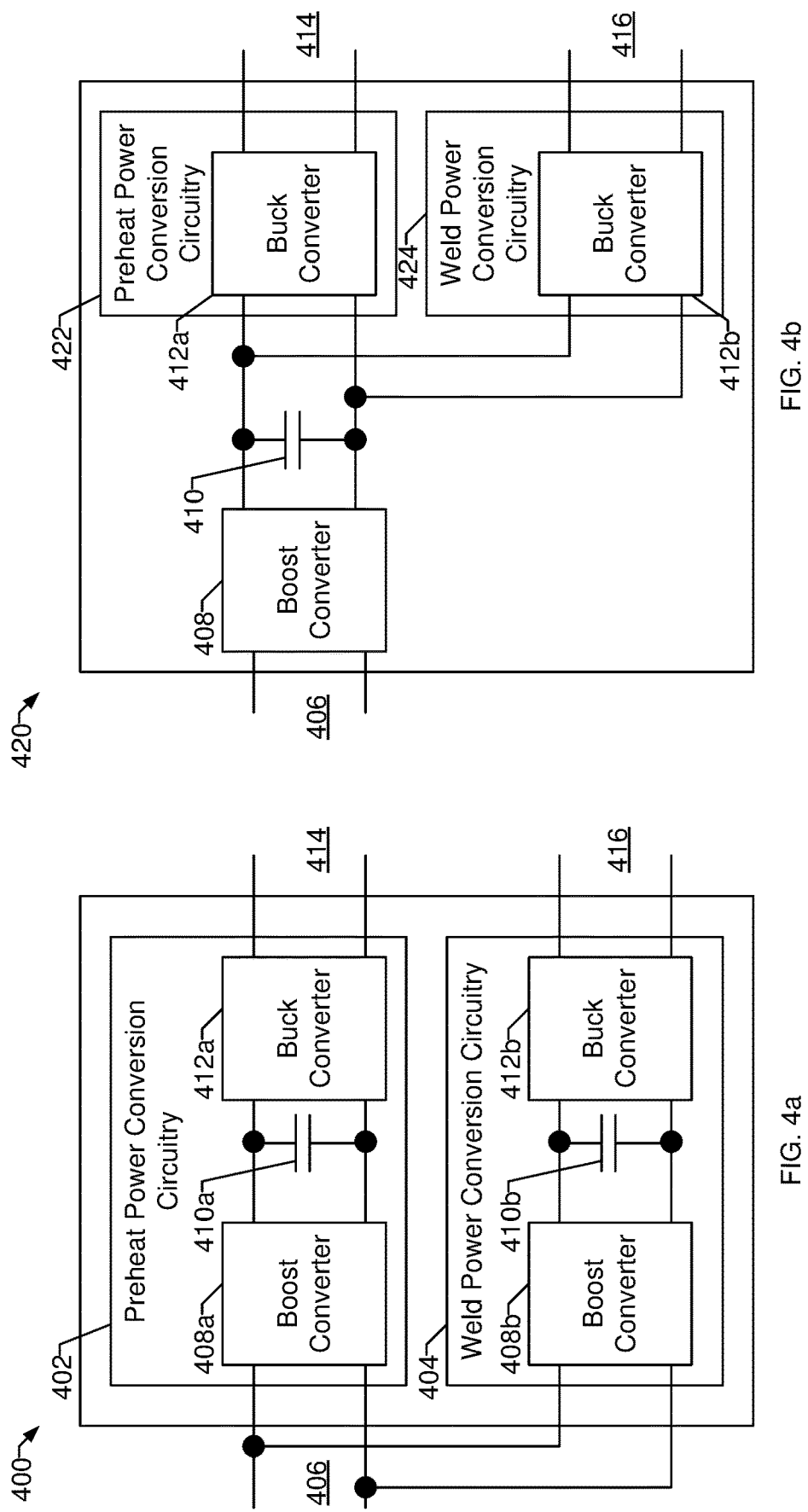
FIG. 4a is a block diagram of an example implementation of the power conversion circuitry of FIGS. 1, 2, and/or 3.
FIG. 4b is a block diagram of another example implementation of the power conversion circuitry of FIGS. 1, 2, and/or 3.

FIG. 4a is a block diagram of example power conversion circuitry 400 that may be used to implement the power conversion circuitry 58 of FIG. 2 to convert input welding-type power to output welding-type power and preheating power. The example power conversion circuitry 400 of FIG. 4a includes preheat power conversion circuitry 402 and weld power conversion circuitry 404. The preheat power conversion circuitry 402 and weld power conversion circuitry 404 are both coupled to an input to receive respective portions of the input power 406 (e.g., from the primary power source 22, or from the power source 12, via the terminals 40 of FIG. 2).

Each of the example preheat power conversion circuitry 402 and the weld power conversion circuitry 404 includes respective conversion circuitry. In the example of FIG. 4a, the preheat power conversion circuitry 402 includes a boost converter circuit 408a, a bus capacitor 410a, and a buck converter circuit 412a. Similarly, the weld power conversion circuitry 404 includes a boost converter circuit 408b, a bus capacitor 410b, and a buck converter circuit 412b. The boost converter circuits 408a, 408b are each configured to convert the input power 406 to respective bus voltages that are output to the respective buck converters 412a, 412b. The example buck converters 412a, 412b convert the bus voltage to a desired output. For example, the buck converter 412a converts the bus voltage output by the boost converter 408a to a preheating output 414, having a preheating output voltage and/or a preheating output current. Similarly, the buck converter 412b converts the bus voltage output by the boost converter 408b to a welding output 416, having a welding output voltage and/or a welding output current The bus capacitors 410a, 410b store energy to reduce bus voltage ripple due to changes in power output by the buck converters 412a, 412b.

The example control circuitry 32, 56 of FIGS. 1, 2, and/or 3 controls the boost converters 408a, 408b and the buck converters 412a, 412b, according to the input welding-type current and the desired preheating output and the desired welding output. The control circuitry 32, 56 may control one or both of the preheat power conversion circuitry 402 and the weld power conversion circuitry 404 to be off at a given time. For example, the control circuitry 56 may control the weld power conversion circuitry 404 to output welding-type current for a first welding operation, or a first portion of a welding operation, and then control both of the preheat power conversion circuitry 402 and the weld power conversion circuitry 404 to perform a second welding operation, or a second portion of a welding operation, using both welding a preheating power.

In some examples, the control circuitry 32, 56 is configured to adjust control of the weld power conversion circuitry to adjust the welding output 416 based on the preheating output, such as to maintain a consistent heat input to the weld and/or increase deposition. For example, the control circuitry 32, 56 may decrease the welding output 416 (e.g., weld voltage and/or the weld current) via the weld power conversion circuitry 404 based on controlling the preheat power conversion circuitry 402 to increase in the preheat output 414.

FIG. 4b is a block diagram of example power conversion circuitry 420 that may be used to implement the power conversion circuitry 58, 302 of FIGS. 2 and/or 3 to convert input welding-type power to output the welding output 416 and the preheating output 414. The example power conversion circuitry 420 of FIG. 4b includes preheat power conversion circuitry 422 and weld power conversion circuitry 424. In contrast with the example power conversion circuitry 400 of FIG. 4a, the preheat power conversion circuitry 422 and weld power conversion circuitry 424 receive a bus voltage from a shared boost converter 408 instead of receiving the input power 406 as an input.

The preheat power conversion circuitry 422 and weld power conversion circuitry 424 are both coupled to a bus voltage that is output by the boost converter 408, which converts the input power 406 to the bus voltage. In the example of FIG. 4b, the bus capacitor(s) 410 are also shared between the preheat power conversion circuitry 422 and weld power conversion circuitry 424, although each of the preheat power conversion circuitry 422 and weld power conversion circuitry 424 may have respective bus capacitors 410. The example buck converters 412a, 412b convert the bus voltage to a desired output. The example control circuitry 32, 56 of FIG. 1, 2, or 3 controls the boost converter 408 and the buck converters 412a, 412b to output the preheating output 414 and/or the welding output 416.

While the examples of FIGS. 1, 2, 4a, and 4b are disclosed above with reference to a preheating wire feeder, other types of welding accessories may also be used. For example, welding pendants may be configured to include the power conversion circuitry disclosed herein to provide welding power and preheating power based on input welding-type power, and used in conjunction with a conventional wire feeder to provide welding and preheating power to a welding torch.

Furthermore, while the foregoing examples are described with reference to resistively preheating a wire at a welding torch, the disclosed examples may also be used in conjunction with other forms of wire heating, such as inductive heating of the wire, hotwire techniques, arc-based preheating in which an electrical arc is used to apply heat to the wire prior to the welding arc, laser-based preheating, and/or any other forms of wire heating. For example, the preheating circuit (e.g., contact tips 18, 20) may be replaced with any other type of preheater, such as other configurations of resistive preheating (e.g., via two or more contact points on the welding wire 54), inductive heating of the welding wire 54 (e.g., via routing the welding wire 54 through or near an induction coil), arc-based preheating (e.g., via one or more tungsten electrodes configured to establish an electrical arc to the welding wire 54), laser-based preheating (e.g., via a laser configured to output energy to the welding wire 54), radiant heating (e.g., via heating coils not in contact with the welding wire 54 but configured to heat the welding wire 54 via radiation), convective heating (e.g., via heating coils, ceramic, or other heated material configured to contact the welding wire 54 to transfer heat to the welding wire 54), and/or any other preheating technique.

Figure 5:
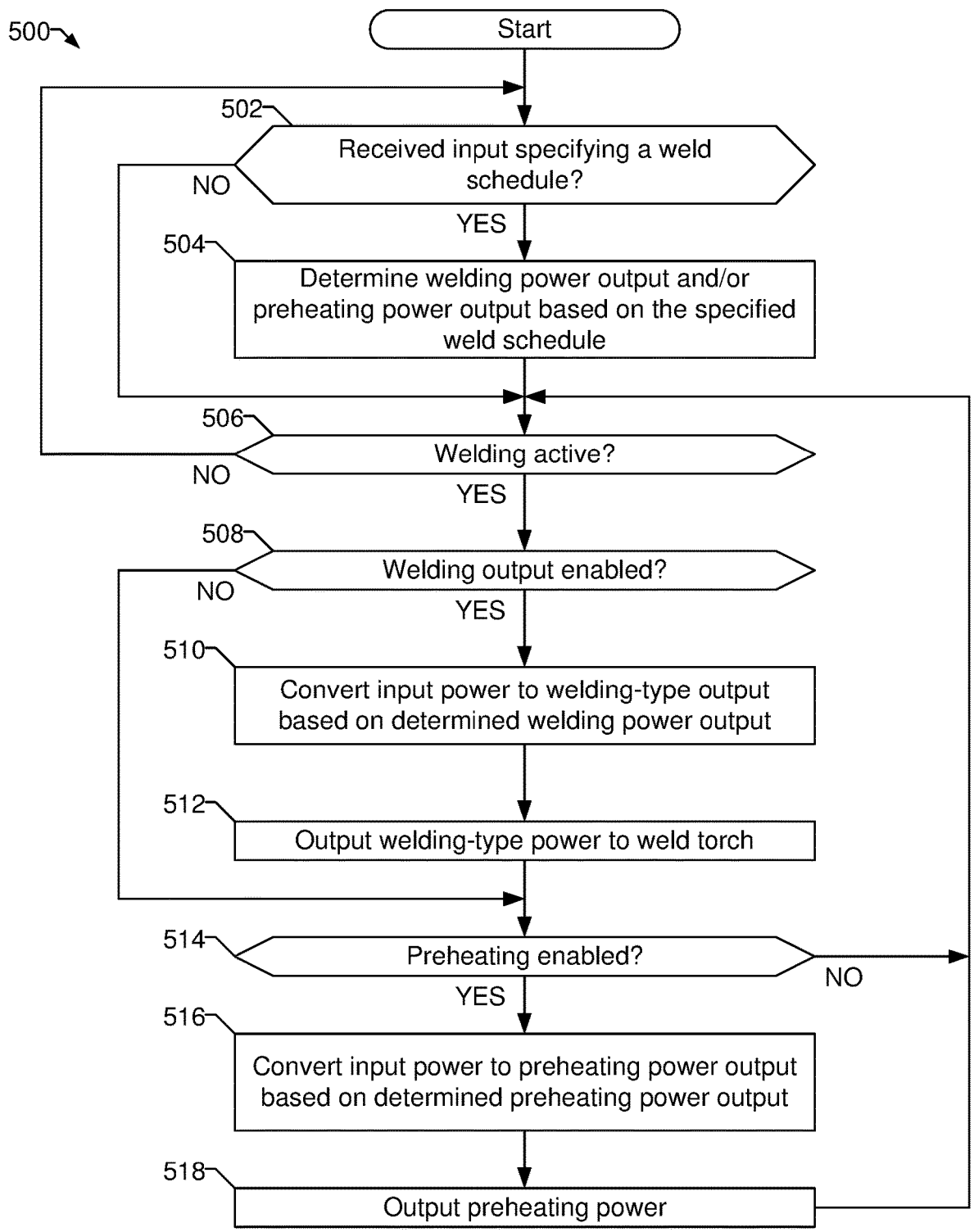
FIG. 5 is a flowchart representative of example machine readable instructions which may be executed by the example welding accessory of FIG. 1 or FIG. 2 and/or the example welding-type power source of FIG. 3, to control welding-type power and preheating power based on an input signal specifying a weld schedule.

FIG. 5 is a flowchart representative of example machine readable instructions 500 which may be executed by control circuitry of the example preheating wire feeder 16 of FIG. 1, or another welding accessory, to convert welding-type power to welding-type power and preheating power. The example instructions 500 are described below with reference to the preheating wire feeder 16 of FIG. 2, and the example power conversion circuitry 400 of FIG. 4a. However, the instructions 500 may be executed using other implementations of the preheating wire feeder 16, the power conversion circuitry 58, and/or other welding accessories.

At block 502, the control circuitry 56 determines whether an input specifying a weld schedule has been received. For example, the control circuitry 56 may receive a communication from an input device such as the power selector circuitry 52, the user interface 66, and/or the operator interface 34. The input may specify a particular weld schedule of one or more stored weld schedules, and/or include a relative input that indicates a weld schedule relative to a current weld schedule or parameter set (e.g., a "next" schedule selection, a "previous" schedule selection, left/right selectors, up/down selectors, etc.).

If an input specifying a weld schedule has been received (block 502), at block 504 the control circuitry 56 determines a welding power output and/or a preheating power output based on the specified weld schedule. For example, the control circuitry 56 may look up the selected weld schedule in the memory 84, and implement welding and/or preheating parameters such as weld voltage, wire feed speed, and/or preheating voltage.

After determining the welding power output and/or the preheating power output (block 504), or if an input specifying a weld schedule has not been received (block 502), at block 506 the control circuitry 56 determines whether welding is active. For example, the control circuitry 56 may determine whether a trigger signal has been received from a handheld torch, or a power output command has been received from a robotic welding system. If welding is not active (block 506), control returns to block 502.

If welding is active (block 506), at block 508 the control circuitry 56 determines whether a welding output is enabled. For example, the control circuitry 56 may determine whether the welding power output determined in block 504 is more than a threshold arc output. If the welding output is enabled (block 508), at block 510 the control circuitry 56 controls the power conversion circuitry 58 (e.g., the weld power conversion circuitry 404 of FIG. 4a) to convert the input power to the welding output 416 based on the determined welding output power. At block 512, the power conversion circuitry 58 (e.g., the weld power conversion circuitry 404) outputs the welding-type power to the welding torch 14 (e.g., via the first contact tip 18 and the workpiece 44).

After outputting the welding-type power to the weld torch (block 512), or if the welding output is not enabled based on the weld schedule (block 510), at block 514 the control circuitry 56 determines whether a preheating output is enabled. For example, the control circuitry 56 may determine whether the preheating power output determined in block 504 is more than threshold, whether a wire feed speed is more than a threshold speed, and/or a wire temperature and/or wire resistance exceed respective thresholds. For example, while the selected weld schedule may indicate a particular preheating power, temperature, or resistance, the example control circuitry 56 may reduce the preheating power and/or turn off preheating when the wire temperature and/or wire resistance are more than a threshold, and/or if the wire is being fed at less than a threshold speed.

If the preheating is enabled (block 514), at block 516 the control circuitry 56 controls the power conversion circuitry 58 (e.g., the preheat power conversion circuitry 402 of FIG. 4a) to convert the input power to the preheating output 414 based on the determined preheating power. At block 518, the power conversion circuitry 58 (e.g., the preheat power conversion circuitry 402) outputs the preheating power. For example, the power conversion circuitry 58 may output the weld power to the welding torch 14 (e.g., via the first contact tip 18 and the second contact tip 20 for resistive preheating). Additionally or alternatively, the power conversion circuitry 58 may output the preheating power to a preheating device within the wire feed assembly 60, or to a preheating device integral with the welding cable between the wire feeder 16 and the torch 14.

After outputting the preheating power (block 518), or if preheating is not enabled (block 514), control returns to block 506 to determine whether welding is still active.

While blocks 508-512 and blocks 514-518 are illustrated as sequential, blocks 508-512 may be performed in parallel with blocks 514-518 to control the power conversion circuitry 58 to output the welding-type power and the preheating power simultaneously while welding is active.

Figure 6:
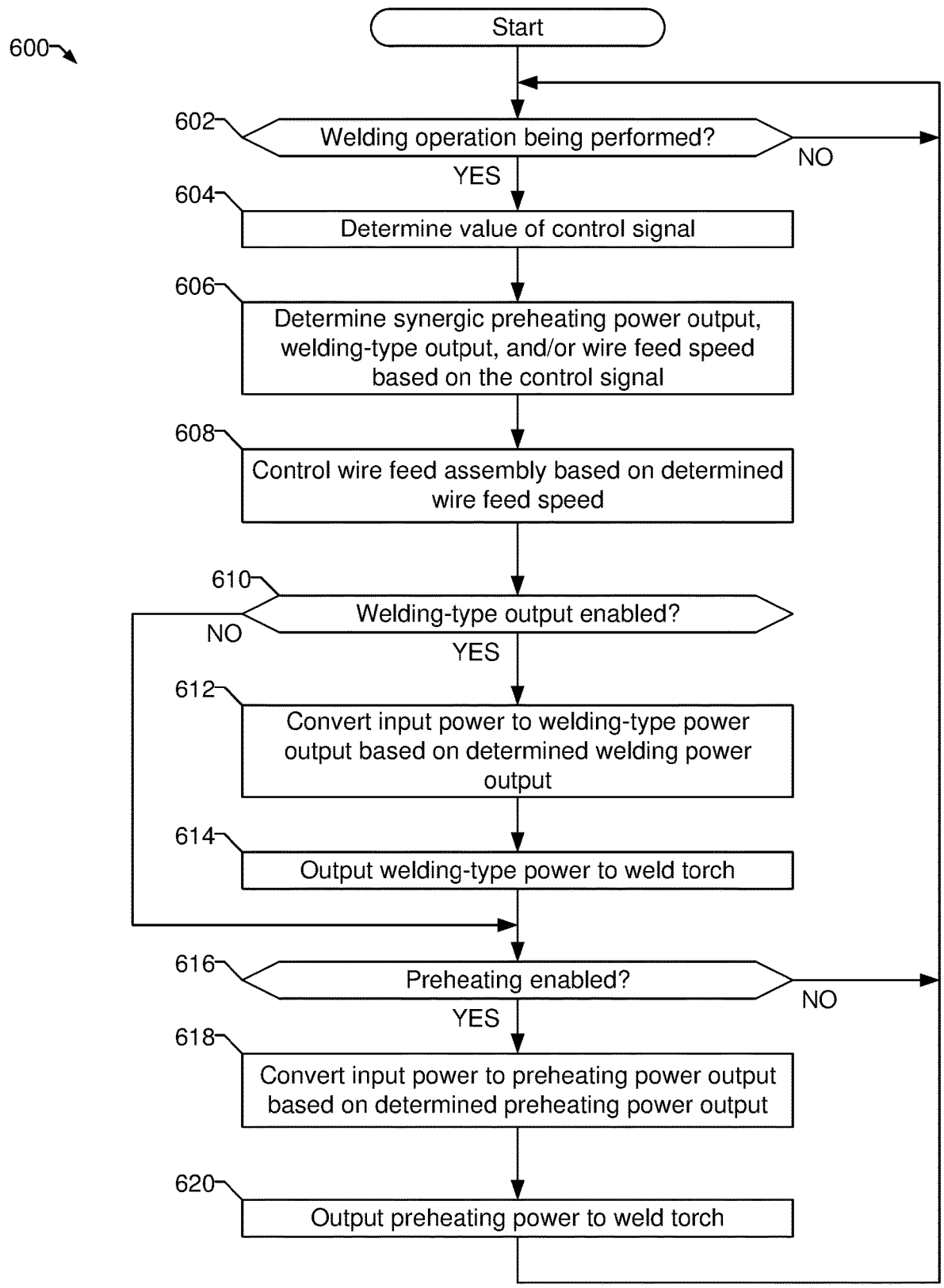
FIG. 6 is a flowchart representative of example machine readable instructions which may be executed by the example welding accessory of FIG. 1 or FIG. 2 and/or the example welding-type power source of FIG. 3, to synergically control welding-type power and preheating power based on an input signal.

FIG. 6 is a flowchart representative of example machine readable instructions 600 which may be executed by the example welding systems of FIG. 1 or FIG. 2 and/or the example welding-type power source 300 of FIG. 3, to synergically control welding-type power and preheating power based on an input signal. The example instructions 600 are described below with reference to the preheating wire feeder 16 of FIG. 2, and the example power conversion circuitry 400 of FIG. 4a. However, the instructions 600 may be executed using other implementations of the power source 12, the preheating wire feeder 16, the power conversion circuitry 58, and/or other welding power sources and/or welding accessories.

At block 602, the control circuitry 56 determines whether a welding operation is being performed. For example, the control circuitry 56 may determine whether a trigger signal has been received from a handheld torch, or a power output command has been received from a robotic welding system. If a welding operation is not being performed (block 602), control iterates at block 602 to await a welding operation.

If a welding operation is not being performed (block 602), at block 604, the control circuitry 56 determines a value of a control signal (e.g., from the power selector circuitry 52). For example, the control circuitry 56 may receive a communication or signal from an input device such as the power selector circuitry 52, the user interface 66, and/or the operator interface 34, having a value within a predetermined range. The input (e.g., an analog signal or encoded digital signal) may be received from a trigger, a wheel, a dial, a knob, a foot pedal, and/or any other input device that generates the signal (e.g., via an encoder, a potentiometer, etc.).

At block 606, the control circuitry 56 determines a synergic welding power output, a synergic preheating power output, and/or a synergic wire feed speed based on the value of the control signal. based on the specified weld schedule. For example, the control circuitry 56 may look up the value of the control signal in the memory 84, and implement welding and/or preheating parameters such as weld voltage, wire feed speed, and/or preheating voltage based on the value and the synergic control scheme represented by the range of values. For example, the synergic control scheme may be representative of a balance between welding power and preheating power (e.g., a balance between weld penetration and deposition), representative of a heat input into the weld (e.g., increasing and decreasing heat input by primarily increasing and decreasing the welding output and wire feed speed while compensating via preheating), representative of weld speed (e.g., increasing and decreasing deposition by primarily increasing and decreasing preheating and wire feed speed, while compensating via the welding output), and/or representative of any other parameters and/or variables. In some examples, the operator may select the synergic control scheme.

At block 608, the control circuitry 56 controls the wire feed assembly 60 based on the determined wire feed speed. At block 610 the control circuitry 56 determines whether a welding output is enabled. For example, the control circuitry 56 may determine whether the welding power output determined in block 606 is more than a threshold arc output. If the welding output is enabled (block 610), at block 612 the control circuitry 56 controls the power conversion circuitry 58 (e.g., the weld power conversion circuitry 404 of FIG. 4a) to convert the input power to the welding output 416 based on the determined welding output power. At block 614, the power conversion circuitry 58 (e.g., the weld power conversion circuitry 404) outputs the welding-type power to the welding torch 14 (e.g., via the first contact tip 18 and the workpiece 44).

After outputting the welding-type power to the weld torch (block 614), or if the welding output is not enabled based on the value of the control signal (block 610), at block 616 the control circuitry 56 determines whether a preheating output is enabled. For example, the control circuitry 56 may determine whether the preheating power output determined in block 606 is more than threshold, whether a wire feed speed is more than a threshold speed, and/or a wire temperature and/or wire resistance exceed respective thresholds. For example, while the selected weld schedule may indicate a particular preheating power, temperature, or resistance, the example control circuitry 56 may reduce the preheating power and/or turn off preheating when the wire temperature and/or wire resistance are more than a threshold, and/or if the wire is being fed at less than a threshold speed.

If the preheating is enabled (block 616), at block 618 the control circuitry 56 controls the power conversion circuitry 58 (e.g., the preheat power conversion circuitry 402 of FIG. 4a) to convert the input power to the preheating output 414 based on the determined preheating power. At block 620, the power conversion circuitry 58 (e.g., the preheat power conversion circuitry 402) outputs the preheating power. For example, the power conversion circuitry 58 may output the weld power to the welding torch 14 (e.g., via the first contact tip 18 and the second contact tip 20 for resistive preheating). Additionally or alternatively, the power conversion circuitry 58 may output the preheating power to a preheating device within the wire feed assembly 60, or to a preheating device integral with the welding cable between the wire feeder 16 and the torch 14.

After outputting the preheating power (block 620), or if preheating is not enabled (block 616), control returns to block 602 to determine whether the welding operation is still being performed.

While blocks 610-614 and blocks 616-620 are illustrated as sequential, blocks 610-614 may be performed in parallel with blocks 616-620 to control the power conversion circuitry 58 to output the welding-type power and the preheating power simultaneously while welding is active.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
    power conversion circuitry configured to:
        output welding-type power to a weld circuit; and
        output preheating power to a preheater; and
    control circuitry configured to:
        automatically define a first one of a plurality of preset weld schedules based on a second one of a plurality of preset weld schedules;
        during a welding operation, receive an input selecting one of the plurality of preset weld schedules, each of the plurality of preset weld schedules specifying a predetermined combination of a welding-type output power and a preheating output power, wherein the first one of the plurality of preset weld schedules defines substantially zero preheating output power and the second one of the plurality of preset weld schedules defines a nonzero preheating output power; and
        during the welding operation, control the power conversion circuitry to output the welding-type power and the preheating power based on the selected one of the plurality of preset weld schedules.

2. The welding system as defined in claim 1, wherein the power conversion circuitry comprises:
    weld power conversion circuitry configured to output the welding-type power; and
    preheating power conversion circuitry configured to output the preheating power.

3. The welding system as defined in claim 2, wherein the weld power conversion circuitry is configured to convert a first portion of welding-type power received at the power conversion circuitry to the welding-type power and the preheating power conversion circuitry is configured to convert a second portion of the welding-type power received at the power conversion circuitry to the preheating power.

4. The welding system as defined in claim 2, wherein the weld power conversion circuitry is configured to convert a first portion of alternating current input power received at the power conversion circuitry to the welding-type power and the preheating power conversion circuitry is configured to convert a second portion of the alternating current input power received at the power conversion circuitry to the preheating power.

5. The welding system as defined in claim 1, wherein the control circuitry is configured to receive the input from an operator input device.

6. The welding system as defined in claim 5, wherein the input is indicative of a state of the operator input device, wherein the control circuitry is configured to:
    while the input indicates that the operator input device is depressed or activated by the operator, select a first one of the plurality of preset weld schedules, the first one of the plurality of weld schedules specifying a nonzero preheating current; and
    while the input indicates that the operator input device is not depressed or inactivated, select a second one of the plurality of preset weld schedules.

7. The welding system as defined in claim 6, wherein the second one of the plurality of preset weld schedules specifies substantially zero preheating current.

8. The welding system as defined in claim 1, wherein the first one of the plurality of preset weld schedules comprises a first welding output power and a first preheating output power, and the second one of the plurality of preset weld schedules comprises a second welding output power and a second preheating output power.

9. The welding system as defined in claim 8, wherein the first one of the plurality of preset weld schedules comprises a first wire feed speed, and the second one of the plurality of preset weld schedules comprises a second wire feed speed.

10. The welding system as defined in claim 9, wherein the first welding output power is greater than the second welding output power, the second preheating output power is greater than the first preheating output power, and the second wire feed speed is greater than the first wire feed speed.

11. The welding system as defined in claim 8, wherein the second preheating power output is substantially zero, and the first preheating power output is greater than zero.

12. The welding system as defined in claim 1, wherein the control circuitry is configured to receive the input from welding control system via a communications network.

13. A welding system, comprising:
    power conversion circuitry configured to:
        output welding-type power to a weld circuit; and
        output preheating power to a preheater; and
    control circuitry configured to synergically control the power conversion circuitry to output the welding-type power and the preheating power simultaneously during a welding operation based on a control signal received during the welding operation by determining the preheating power, the welding-type power, and a wire feed speed based on a value of the control signal and a predetermined relationship, the control signal controlling a balance between welding power and preheating power, an overall power applied to the weld, or a deposition speed of the welding operation, wherein the control signal is representative of an amount a trigger of a welding torch is depressed, an amount a foot pedal is depressed, or an output of a knob input device or a dial input device.

14. The welding system as defined in claim 13, further comprising communications circuitry configured to receive the control signal.

15. The welding system as defined in claim 14, wherein the communication circuit is configured to receive the control signal from at least one of the welding-type torch or a foot pedal.

16. The welding system as defined in claim 13, wherein the control circuitry is configured to synergically control a wire feed speed with the welding-type power and the preheating power.

17. The welding system as defined in claim 13, wherein the control circuitry is configured to synergically control the preheating power within a range of power between zero and an upper preheating power limit.

18. The welding system as defined in claim 13, wherein the control circuitry is configured to synergically control a total heat input to the weld based on the control signal received from a control device during the welding operation.

19. The welding system as defined in claim 18, wherein the control circuitry is configured to maintain a substantially constant total heat input by controlling at least one of the power conversion circuitry to output the preheating power and the welding-type power based on the control signal.

* * * * *